United States Patent Office 3,446,623
Patented May 27, 1969

3,446,623
METHOD FOR PREPARING A COOKIE-LIKE PRODUCT
Jack C. Gray, Port Washington, and Allan N. Cohan, Cedarhurst, N.Y. (both of 110 Central Ave., Farmingdale, N.Y. 11735)
No Drawing. Filed Nov. 27, 1964, Ser. No. 414,459
Int. Cl. A21d *13/08*
U.S. Cl. 99—1                      4 Claims

ABSTRACT OF THE DISCLOSURE

The method of preparing a cookie-like product wherein about equal parts by weight of casein, sugar and protein flour, shortening in the amount of about 20% by weight of the combined weight of said casein, sugar and protein flour are mixed with hot water and a sufficient quantity of sodium bicarbonate to react with the casein to produce sodium caseinate and carbon dioxide, followed by allowing the mass to cool, then adding minor proportions of vitamins and flavoring and dehydrating the mass while cool and under partial vacuum.

---

This invention relates to a novel cookie, wafer, or pastry-like products and to the method of preparing the same without the step of "baking" the product in its usual sense. In fact, the only heating of ingredients occurs in the mixing bowl, and the product is frozen and then subjected to freeze dehydration, or some other method of dehydration treatment, depending upon the particular ingredients and the amount of moisture to be removed. The product of the present invention has the flaky, short and porous texture, the crumb structure, the appearance, and the taste, of a baked product. The second or dehydrating step is normally, and most expeditiously, carried out under freezing conditions and the process may, therefore, be properly termed "freeze-dehydration," although in some cases the dehydration may be done at near room temperature.

An important object of the invention is to provide a new product, and the method of making the same, having an unusually high protein and vitamin content and wherein vitamins are present in a very palatable and easily digestible form. These vitamins, proteins, and flavors which are either destroyed or driven off during conventional oven baking, are preserved in the finished product in their most desired state.

The process of baking cookies and similar sweetened cake type of products with high shortening content normally takes place in one operation in a heated oven and during this baking there occurs both a chemical reaction and a dehydration of the dough product. The heat in the oven necessary to the baking operation damages the heat labile or sensitive materials such as certain amino acids, vitamins and volatile flavoring materials. Frequently baking also develops certain off-flavors. This is especially true where vitamins are added.

In accordance with the present invention, the first step which is the chemical reaction is conducted in the mixing bowl where certain but not all of the ingredients are intimately mixed while hot. For instance, the water and the shortening used may be heated to reach such a temperature, prior to introduction of the other ingredients, as to produce enough heat to react two of the ingredients, namely sodium bicarbonate and casein to produce carbon dioxide gas and sodium caseinate.

After the mixture has cooled sufficiently in the mixing apparatus, the other ingredients including those which are extremely sensitive to heat are added and thoroughly blended. The product after standing for a period to allow the leavening system to fully perform its function, is then cut into sections of desired size and subjected to one of several processes of water removal while frozen, chilled or even at near room temperature under partial vacuum. These processes include freeze drying and other dehydrating treatments such as continuously passing extremely cold dry air over the product or vacuum drying at room temperature.

One of the unique features of the cookie type of food products of the present invention is that it has an unusually high amount of protein and vitamins, all of high biological activity, and with a desirable porous texture and flavor. This high protein content is compared with the usual cookie of commerce with only about 6% protein.

The desirable characteristics of texture and ingredients are maintained by the freeze baking technique which has not heretofore been used in the manufacture of the nearest comparable products.

Another object of the invention is the use of casein in a highly acceptable form, as a source of high protein content. Casein has not been used in many food applications because it is insoluble in water and has a vitreous, gritty texture when eaten. Its sodium salt has not been used, even at moderately high levels in baked products, because when dehydrated it tends to form a continuous solid structure. Also, the large amount of water of hydration which must be used in the dough make up, because of the high absorption of sodium caseinate, is difficult to eliminate in baking. In fact, the baking of a cookie high in sodium caseinate tends to first dehydrate the exterior of the cookie, resulting in a tough nonporous skin which encapsulates the water in the interior grain structure.

Flour is a major constituent in the product of the present invention and while ordinary wheat flour can be used, it is preferred to employ a high protein wheat product generally known as "vital wheat gluten." It has the ability to form a thin continuous film, so desirable to the texture of the finished product. Also a low fat soy flour or a peanut flour can be used, or a soy or corn "protein isolate." Various combinations of these flours with or without conventional wheat flour, may also be used. The gluten proteins of the flour or flour mixture and the casein, together with an alkaline agent such as sodium bicarbonate, produce sodium caseinate and in the case of sodium bicarbonate also produce carbon dioxide which along with the dough water, which vaporizes under partial vacuum, provide the leavening system and means of entrapping the gas in the dough until such time as the dough is sufficiently dehydrated to be solidified. Instead of sodium bicarbonate, ammonium carbonate or ammonium bicarbonate my be used. Also potassium bicarbonate may be employed if the product is intended for a sodium free diet but this affects the texture of the finished product and it imparts a slightly bitter flavor.

There is also added to the mass a suitable quantity of shortening whose function it is to tenderize the product by disrupting the continuous structure of the other ingredients. Without the lubricating action of the shortening, the combination of the sodium caseinate and the unreacted casein would have a slight toughening effect to the texture. Any commercial shortening, hydrogenated or otherwise, normally used in cookies and other baked goods may be used, either alone or with an emulsifier added.

The casein is first mixed with the mild alkali such as sodium bicarbonate, which upon hydration, reacts with and solubilizes only the surface of the protein particles which must be in a certain size range. The use of a limited quantity of the soda also assures limiting the extent of the reaction with the casein particles.

Such a reaction would not proceed without moisture and is speeded up with a certain measure of heat. They are furnished by heating water to about 175° F. and a quantity of shortening is also heated to about the same temperature and the water and fat, and the sugar, either dry or in the water solution, are added to the casein, the vital wheat gluten, soda, salt and the ingredients intimately mixed. The amount of water used may be about 10 parts by weight of the total ingredients set forth in the following Example I. After the reaction between the moist soda and the casein has taken place and the mass cooled and other heat sensitive ingredients added and mixed, it is ready for the freeze dehydration.

EXAMPLE I

In a preferred method of making a high protein and vitamin wafer the following ingredients and percentages by weight are used:

Composition

| | |
|---|---|
| Casein | 25.0 |
| Vital wheat gluten | 21.0 |
| Cocoa | 7.0 |
| Soda | 1.6 |
| Salt | 1.0 |
| Shortening | 15.0 |
| Sugar | 28.5 |
| Vitamin mixture | .6 |
| Flavors | 0.3 |
| Solids total | 100.0 |
| Dough water | 10.0 |

For optimum performance, the particle size of the casein should be such that 100% should pass through a 50 mesh screen and not over 25% through a 100 mesh screen.

A "Hobart" 120 mixer with a 10 quart bowl and paddle are used for blending the ingredients. The casein, vital wheat gluten, sugar, cocoa, sodium bicarbonate and salt are placed in the bowl. The water and shortening are heated to 175° F. and then liquid ingredients are added to the dry ingredients. Blending continues for about 30 seconds on "low" speed and then continued for one minute on second speed. The vitamin mixture and flavoring are then added and mixing is continued for 30 seconds at low speed.

When the hot water and hot fat are added to the mixture containing the casein and soda, the latter reacts with the casein to form a soluble sodium caseinate which is extended into a filmy network by the mixing action. Also the casein that is not reacted to form sodium caseinate has been reduced in particle size to such an extent so as not to be noticeable when the finished wafer is eaten.

The amount of casein reacted is controlled in part by the particle size of the casein earlier mentioned. By forming a filmy network of sodium caseinate which surrounds the other moisture-holding ingredients, there is establihsed the framework for a leavening system which is activated by water vaporipation and the release of some gases, such as carbon dioxide, from solution when vacuum is applied.

Under vacuum, these encapsulated "cells" expand and rupture to develop an expanded grain-like structure with eventual release of moisture from the ruptured "cells."

EXAMPLE II

Example II is the same as Example I except instead of using 25.0 parts of casein, we employ 5 parts of finely powdered casein and 20 parts of lactalbumin and the process is carried out otherwise like Example I.

EXAMPLE III

Example III is for a peanut butter flavored wafer and is as follows:

Composition

| | |
|---|---|
| Casein | 25.0 |
| Peanut flour | 26.0 |
| Soda | 1.5 |
| Salt | 1.0 |
| Shortening | 17.0 |
| Sugar | 28.7 |
| Vitamin mixture | 0.6 |
| Flavors | 0.2 |
| | 100.0 |

EXAMPLE IV

Example IV is for a orange-vanilla wafer and is as follows:

Composition

| | |
|---|---|
| Casein | 25.0 |
| Defatted soy flour | 24.5 |
| Soda | 1.5 |
| Salt | 1.0 |
| Shortening | 17.0 |
| Sugar | 30.0 |
| Vitamin mixture | 0.6 |
| Orange flavor | 0.4 |
| | 100.0 |

The procedure employed in Example I can be followed substantially unchanged in the two last examples wherein the principal difference is in the specific flour used and some of the proportions of the ingredients including the flour are slightly different. So far as proportions are concerned, it will be noted that in the last example sugar represents 30% of the ingredients by weight, casein in each is 25%, the flour is between 21% and 26% and shortening 15% to 17%.

Roughly then, the casein, flour and sugar are present in each in substantially equal quantities, the proportion of shortening is a little over half of the proportion of the first three and the balance is salt, vitamin mixture and flavors, and enough of the alkaline agent to react with a part of the casein to produce the caseinate.

In the several examples given the protein content is roughly 45%. In accordance with the present invention, the product should have not less than 35% protein.

While our process and the means for carrying the same into effect as well as the product of the present invention have been described above, our invention is not limited to the specific examples recited hereinabove, but the protection we desire to obtain by Letters Patent is set forth in the appended claims.

What we claim:
1. The method of preparing a cookie-like product which consists in intimately mixing about equal parts by weight of casein, sugar and protein flour, shortening in the amount of about 20% by weight of said casein, sugar and protein flour in the presence of hot water and a sufficient quantity of sodium bicarbonate to react with the casein to produce sodium caseinate and carbon dioxide, allowing the mass to cool, then adding minor proportions of vitamins and flavoring and dehydrating the mass while cool and under partial vacuum.

2. The method defined in claim 1 wherein the protein flour is soy flour.

3, The method defined in claim 1 wherein the protein flour is wheat gluten.

4. The method defined in claim 1 wherein the protein flour is peanut flour.

References Cited

UNITED STATES PATENTS

| 3,076,710 | 2/1963 | Koolhaas | 99—90 XR |
| 3,158,486 | 11/1964 | Morck et al. | 99—86 |
| 3,185,574 | 5/1965 | Gabby et al. | 99—86 |

RAYMOND N. JONES, Primary Examiner.

U.S. Cl. X.R.

99—86, 92, 199